United States Patent
Pradun et al.

(10) Patent No.: US 12,352,633 B2
(45) Date of Patent: Jul. 8, 2025

(54) SENSING METHOD FOR CYLINDRICAL SURFACES

(71) Applicant: ULTRA CLEAN HOLDINGS, INC., Hayward, CA (US)

(72) Inventors: James Pradun, San Jose, CA (US); Michael Ramacciotti, Fremont, CA (US); Genaro Rodriguez, San Jose, CA (US); Alan Camyre, Vail, AZ (US); Jon Hylbert, Los Gatos, CA (US)

(73) Assignee: ULTRA CLEAN HOLDINGS, INC., Hayward, CA (US)

( * ) Notice: Subject to any disclaimer, the term of this patent is extended or adjusted under 35 U.S.C. 154(b) by 561 days.

(21) Appl. No.: 17/686,154

(22) Filed: Mar. 3, 2022

(65) Prior Publication Data
US 2022/0283038 A1    Sep. 8, 2022

Related U.S. Application Data

(60) Provisional application No. 63/157,086, filed on Mar. 5, 2021.

(51) Int. Cl.
*G01K 1/143*   (2021.01)
*G01K 1/08*    (2021.01)
(Continued)

(52) U.S. Cl.
CPC .............. *G01K 1/143* (2013.01); *G01K 1/08* (2013.01); *G01K 1/16* (2013.01); *G01K 1/18* (2013.01); *G01K 13/02* (2013.01)

(58) Field of Classification Search
CPC ........... G01K 1/143; G01K 1/08; G01K 1/16; G01K 1/18; G01K 13/02
See application file for complete search history.

(56) References Cited

U.S. PATENT DOCUMENTS 3,022,478 A * 2/1962 Fish ....................... G01K 1/143
                                            374/E1.019
10,364,555 B2 * 7/2019 Trescott .............. G01M 3/2807
(Continued)

FOREIGN PATENT DOCUMENTS

CN    104048773 A    9/2014
CN    108291826 A    7/2018
(Continued)

OTHER PUBLICATIONS

Poellath et al. English machine translation of DE-102012108388-A1 (Year: 2014).*

(Continued)

*Primary Examiner* — Nathaniel T Woodward
*Assistant Examiner* — Philip L Cotey
(74) *Attorney, Agent, or Firm* — Patterson + Sheridan, LLP

(57) ABSTRACT

Provided herein is an apparatus and method for sensing the temperature of a tubing wall, and inferentially the temperature of a fluid within the tubing. The apparatus includes first and second clamp bodies, the first clamp body comprising a heat transfer element and a first and a second electrical connection connected thereto, the second clamp body connectable to the first clamp body to form a clamping cavity therebetween within which a clamped element having a wall is securable, the heat transfer element configured to contact an outer surface of a clamped element therebetween. The heat transfer element may include a thermally conductive compliant element extending through one of the clamp bodies and inwardly of the clamping cavity.

17 Claims, 11 Drawing Sheets

(51) Int. Cl.
*G01K 1/16* (2006.01)
*G01K 1/18* (2006.01)
*G01K 13/02* (2021.01)

(56) References Cited

U.S. PATENT DOCUMENTS

| | | | | |
|---|---|---|---|---|
| 11,073,429 | B2* | 7/2021 | Rud | G01K 13/02 |
| 2010/0074586 | A1* | 3/2010 | Panarello | G02B 6/4457 |
| | | | | 29/890.03 |
| 2013/0128925 | A1* | 5/2013 | Hoenicka | G01K 1/08 |
| | | | | 374/208 |
| 2015/0185085 | A1* | 7/2015 | Converse | G01K 1/143 |
| | | | | 374/100 |
| 2017/0016775 | A1* | 1/2017 | Decker | G01K 1/08 |
| 2017/0023415 | A1* | 1/2017 | Decker | G01K 1/143 |
| 2017/0284870 | A1* | 10/2017 | Golden | F16M 13/022 |
| 2018/0177064 | A1* | 6/2018 | van Pol | G01M 3/246 |
| 2019/0226918 | A1* | 7/2019 | Hand | G01K 13/02 |
| 2019/0353188 | A1* | 11/2019 | Golden | F16B 2/08 |
| 2020/0096397 | A1* | 3/2020 | Rud | G01K 1/143 |
| 2020/0393306 | A1* | 12/2020 | Yoshihara | G01K 1/14 |
| 2021/0211023 | A1* | 7/2021 | Schmitt | H02K 3/522 |

FOREIGN PATENT DOCUMENTS

| | | | | |
|---|---|---|---|---|
| CN | 109781286 | A | | 5/2019 |
| CN | 109932067 | A | | 6/2019 |
| CN | 110940437 | A | | 3/2020 |
| DE | 102012108388 | A1 | * 3/2014 | G01K 1/143 |
| TW | 202009452 | A | | 3/2020 |

OTHER PUBLICATIONS

PCT/US2022/018746, International Search Report and Written Opinion dated Jul. 1, 2022, 14 pages.
Taiwan Patent Application No. 111108012, Office Action dated Mar. 15, 2023, 13 pages.
Taiwan Application No. 111108012, Office Action dated Jan. 5, 2024, 4 pages.
Thermokon Sensortechnik GmbH, SR65 VFG 868 MHZ, Wireless Contact Temperature Sensor, Datasheet, Issue Date Feb. 25, 2016, 4 pages, <https://titaniumintelligentsolutions.com/wp-content/uploads/2020/10/SR65_VFG_EasySens_Datasheet_en.pdf> . . . .
123Rf, Black temperature sensor on silver metal pipe, downloaded Nov. 8, 2022, 2 page, https://www. 123rf.com/photo_10520358_black-temperature-sensor-on-silver-metal-pipe.html>.
Amphenol Advanced Sensors, Thermometrics Sensor Assemblies, US8845 Integrated Pipe Clip Surface Temperature Sensor, downloaded Nov. 8, 2022, 2 pages, <https://amphenol-sensors.com/en/thermometrics/assemblies/3461-is8845-pipe-clip>.
Amphenol Advanced Sensors, Thermometrics Sensor Assemblies, Clip-On Pipe And Surface Sensor—Type JW/JC, downloaded Nov. 8, 2022, 2 pages, <https://www.amphenol-sensors.com/en/thermometrics/assemblies/2113-type-jw-jc>.
Aquastat Temperature TACO 5632, downloaded Nov. 8, 2022, 2 pages, <https://ghala-sa.com/products/TACO-5632-Aquastat-Temperature-4PC96>.
Kele, Belimo 01ST/01HT/22HT Series, Belimo Contact Temperature Sensors, downloaded Nov. 8, 2022, 2 pages, <https://www.kele.com/temperature-sensors-and-transmitters/belimo-01st/01ht/22ht-series.aspx>.
Honeywell Freeze Protection Control—FPC, downloaded Nov. 8, 2022, 2 pages, <https://hvac-parts-online.com/honeywell-freeze-protection-control-fpc>.
Parker, Transair® Condition Monitoring Sensors & Hardware, downloaded Nov. 8, 2022, 2 pages, <https://ph.parker.com/us/en/transair-condition-monitoring-hardware-for-compressed-air-vacuum-and-inert-gas-piping-systems>.
Kele,Q-Strap Mini, Tasseron Q-Strap-On Mini Temperature Sensors, downloaded Nov. 8, 2022, 2 pages, <https://www.kele.com/temperature-sensors-and-transmitters/q-strap-mini.aspx>.
PST, Rotronic, Pipe temperature sensor RMS-T10-0004, 2 pages, <https://www.directindustry.com/prod/rotronic-ag/product-14766-2206871.html>.
Tasseron Sensors & Controls, Q-Strap Mini, Strap-On Temperature Sensor, downloaded Nov. 8, 2022, 4 pages,. <https://static1.squarespace.com/static/575837b259827e26b5694200//5b894c0540ec9ac78c446d7a/1535724550642/Q-Strap+Mini.pdf>.
www.oventrop.com, downloaded Nov. 8, 2022, 1 page, <https://www.oventrop.com/Pools/pimimages/5445305d21388252baea6506aa9f67f9/org/1389051_frei.jpg>.
Thermaltake, Thermaltake Pacific Temperature Sensor, CL-W151-CU00BL-A, downloaded Nov. 8, 2022, 2 pages, <https://www.thermaltakeusa.com/thermaltake-pacific-temperature-sensor.html>.
ACS Control-System, Catalog 2021, <https://www.acs-controlsystem.de/wp-content/uploads/ACS_Katalog_2022_ohne_Preise.pdf>, downloaded Jan. 20, 2023, 290 pages.
ACS Control-System, Catalog 2021, <https://www.acs-controlsystem.de/wp-content/uploads/ACS_Catalog_2021_ohnePreise.pdf>, English translation downloaded Jan. 20, 2023, 290 pages.
Taiwan Patent Application No. 111108012, Office Action dated Sep. 26, 2023, 12 pages.
European Patent Application No. 25163823.5, extended European Search Report dated Mar. 28, 2025, 8 pages.

* cited by examiner

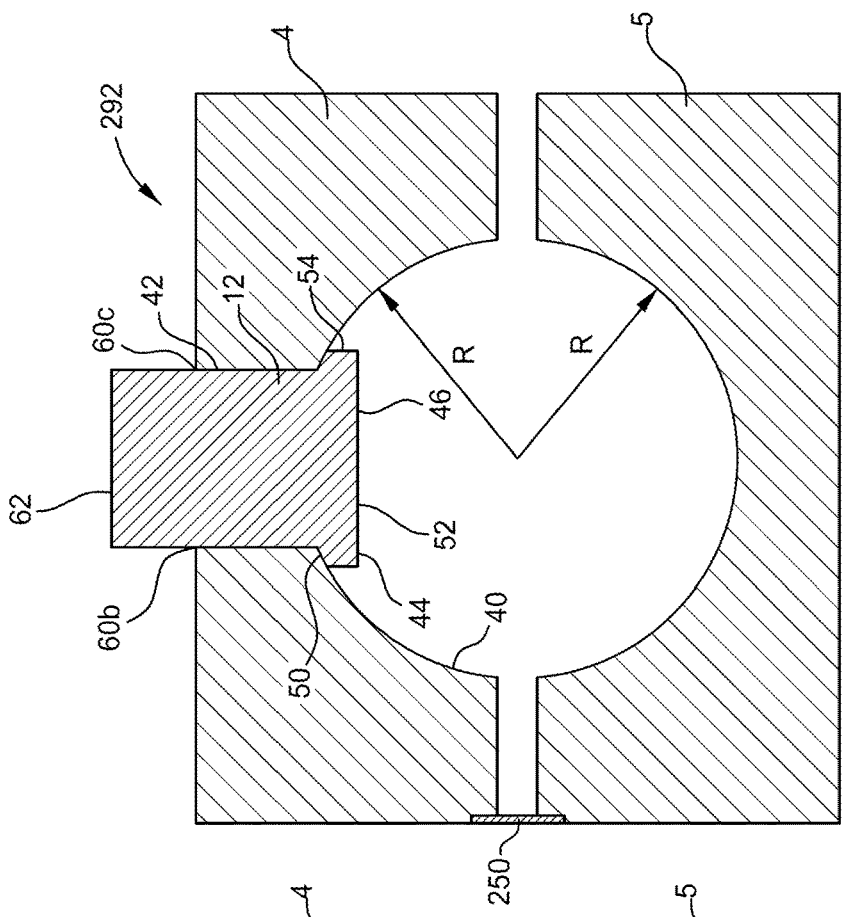
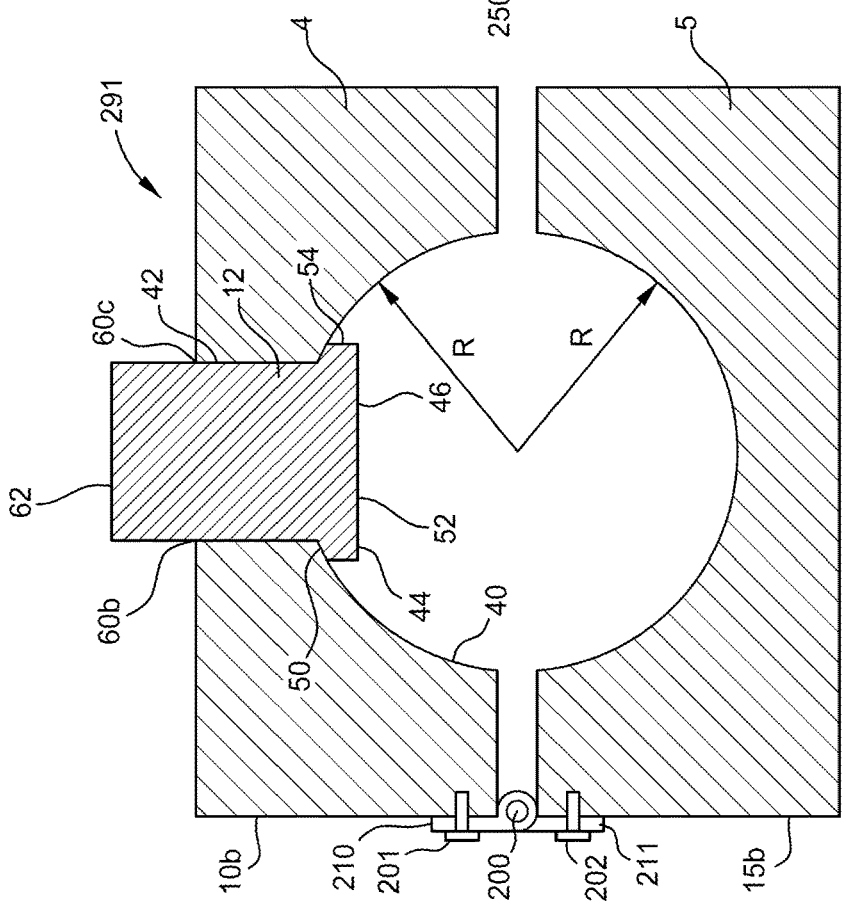

SENSING METHOD FOR CYLINDRICAL SURFACES

CROSS-REFERENCE TO RELATED APPLICATIONS

This application claims benefit of U.S. provisional patent application Ser. No. 63/157,086, filed Mar. 5, 2021, which is herein incorporated by reference.

FIELD

Embodiments of the present invention generally relate to an apparatus and method for sensing the temperature of a tubing, or pipe, wall, and inferentially the temperature of a fluid within the tube or pipe. More particularly, the present invention relates to apparatus, and methods of use of the apparatus, where the apparatus is releasably connected to a tube or pipe and configured to sense the temperature of a pipe or tube wall, and inferentially the temperature of a fluid within the pipe or tube, or the temperature of an element on the exterior or interior wall of the pipe or tube wall.

DESCRIPTION OF THE RELATED ART

Currently, there are few robust solutions for measuring the temperature of the outer wall of a tube or pipe. One known methodology for doing so uses a clip-on device, which snaps or clips over the tube or pipe. These devices have an issue of low clamping force to the tube or pipe and low accuracy due to poor heat transfer between tube or pipe outer wall and the temperature-sensing element of the clip. Other implementations that clamp a heat sensitive element to a tube or pipe have at least one issue of difficult installation or low temperature sensitivity, for example poor temperature measurement accuracy due to poor heat transfer and their large size, as well as thermal losses to the fluid or element, the temperature of which is being measured, the thermal losses induced by the heat sensitive element.

SUMMARY

Provided herein is an apparatus and method for sensing the temperature of a tubing wall, and inferentially the temperature of a fluid within the tubing. The apparatus includes first and second clamp bodies, the first clamp body comprising a heat transfer element and a first and a second electrical connection connected thereto, the second clamp body connectable to the first clamp body to form a clamping cavity therebetween within which a clamped element having a wall is securable, the heat transfer element configured to contact an outer surface of a clamped element therebetween. The heat transfer element may include a thermally conductive compliant element extending through one of the clamp bodies and inwardly of the clamping cavity.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 10A is a sectional view of the clamp assembly of FIGS. 1A to 1C, modified to include a pin hinge connected to adjacent sidewalls of the clamp bodied thereof.

FIG. 10B is a sectional view of the clamp assembly of FIGS. 1A to 1C, modified to include a web hinge connected to adjacent sidewalls of the clamp bodied thereof.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
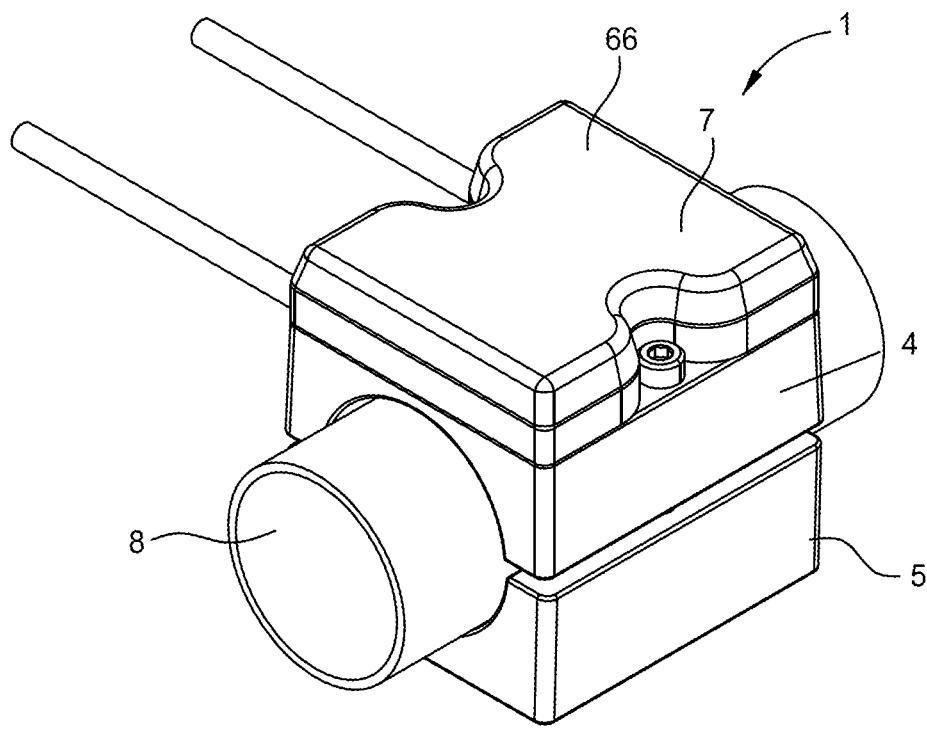
FIGS. 1A-C are isometric views of a clamping assembly for mounting a temperature sensitive element into thermal communication with the outer wall of a tubing or piping.

Provided herein is a temperature sensing or heat generating device configured as a clamp assembly 1. In one aspect thereof, the clamp assembly 1 is configured of opposed first and second halves or bodies 4, 5, the first and second bodies 4, 5 securely fastenable together over a tube 8 using fasteners such as bolts or clips or other attachment elements to secure the pipe or tube therebetween. A thermal device 2 configured as a temperature monitoring or measuring device, or as a heat generating or receiving device, is receivable on one of the bodies, here first body 4, which here is configured to allow the thermal device 2, for example a temperature sensing element, to be mounted thereto to sense the temperature of the exterior wall of a tube 8 over which the clamp assembly 1 is clamped. Here, the thermal device 2 can be configured as one or more of a temperature measuring element useful in a temperature monitoring circuit, a thermal fuse, a thermal alarm device, or other element which senses temperature of an element, here of the outer wall of the tube 8 at least inferentially, or a heat generating or absorbing element to locally absorb heat from, or direct heat into, the outer wall of the tube 8. This heat absorbing or generating element can at least locally change the temperature of a fluid present in the tube 8, including a fluid flowing therein, or heat or cool another material locally within or on the tube 8.

Figure 1B:
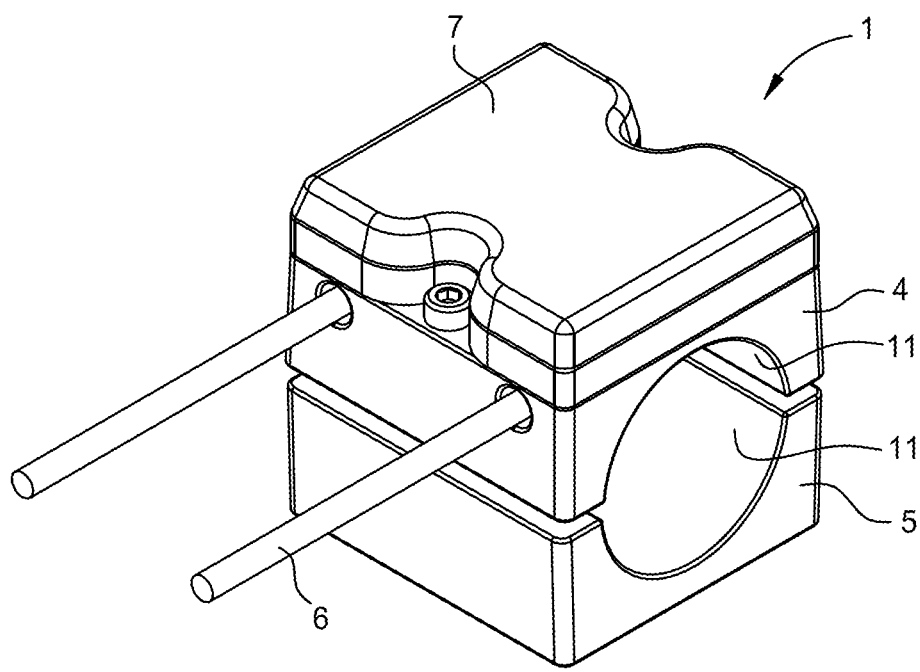
Figure 1C:
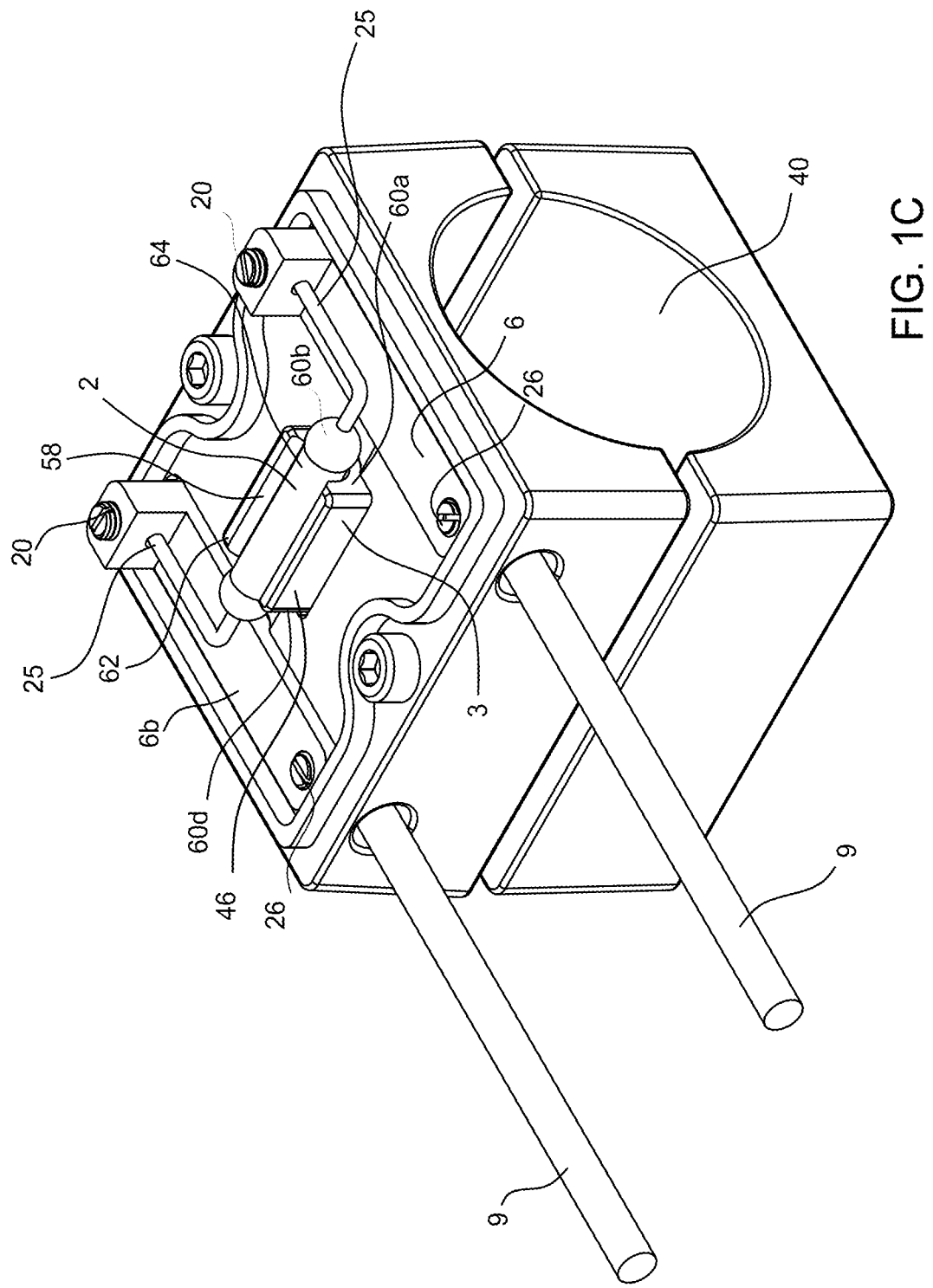

The clamp assembly 1 is configured to provide a heat transfer path between the outer surface of a pipe or tube 8 and the thermal device 2 carried on a portion of one of the bodies, here a first body 4, of the clamp assembly 1. In the aspect hereof shown in FIGS. 1a-1c, clamp assembly 1 includes the first and second clamp bodies 4, 5 having the same construct, with the exception of certain features in first clamp body 4 not present or not needed in second clamp body 5. However, each of the clamp bodies 4, 5 may be configured identically, but the elements to enable heat transfer between the thermal device 2 and the tube 8, and the elements used to control or monitor the thermal device 2, which are mounted on or into the first clamp body 4, will not need to be present in or on the second clamp body 5. Here, each of first clamp body 4 and a second clamp body 5 include two fastener cavities, here a first pair of fastener cavities 13, 14 (first clamp body 4, FIG. 2B) and a second pair of fastener cavities 22, 24 (second clamp body 5, FIG. 2D), and an arched recess 11, here, a semicircular recess 11A having a semi-cylindrical surface 40 of radius R (FIG. 5A) extending inwardly of the tube 8 facing side, i.e., the inwardly facing face 10F of the first and second bodies 4, 5, and also extending between and opening at the opposed end faces 10D, 10E thereof. In addition, first body 4 includes a heat transfer thermal pad 3 connected to the first body 4 and extending therethrough (FIGS. 5A, 5B) and configured for the receipt of the thermal device 2 thereagainst, and a pair of bus bars 6a, b provided to electrically interconnect the thermal device 2 to a device located exteriorly of the clamp assembly 1. A lid 7 extends over the outwardly facing face 10A of the first body 4 (FIGS. 1A, 1B), and over the bus bars 6a, b and thermal pad 3 thereon or therein located as shown in FIG. 1C. Here, the lid 7 is affixed to the first body 4 using an adhesive. The primary function of the clamping assembly 1 is to establish heat transfer between a surface of the pipe or tube 8 and the thermal device 2 held therein or thereon, through the thermal pad 3. Thus, where the thermal device 2 is a temperature-sensing element, the thermal device can accurately detect or infer the temperature of the outer wall of the pipe or tube 8. Similarly, if the thermal device 2 is configured to locally heat or cool the outer surface of the pipe or tube 8, the thermal pad 3 thermally couples the thermal device 2 to the outer surface of the pipe or tube 8, enabling control of the heat transfer into, or from, the wall of the pipe or tube 8 through the thermal pad 3. Thus, the heat transferring thermal pad 3 and first body 4 are together configured to allow the thermal pad 3 to extend through the first body 4 and outwardly of the semi-cylindrical inner surface 40 thereof (i.e., extend from the semi-cylindrical inner surface 40 of body 4 and toward the center of the radius along which the semi-cylindrical surface 40 extends As shown in FIG. 5A), as well as above the opposed outwardly facing face 10A of the first body 4 over which the lid 7 is positioned (FIG. 1C) As a result, a thermal device 2 can be in contact with the portion of the thermal pad 3 extending above the upper surface of the first body 4, whilst the portion of the thermal pad 3 extending through the first body 4 will contact the outer surface of a tube 8 clamped between the first and second bodies 4, 5.

Figure 2A:
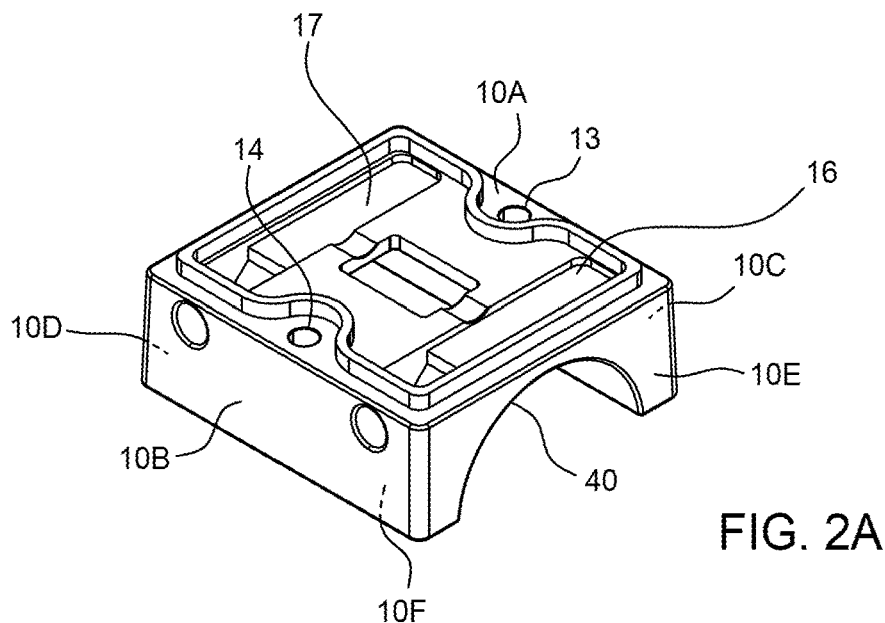
FIGS. 2A-F are isometric views of the clamping assembly for mounting a temperature sensitive element into thermal communication with the outer wall of a tubing or piping, including separate views of the individual clamp bodies thereof.
Figure 2B:
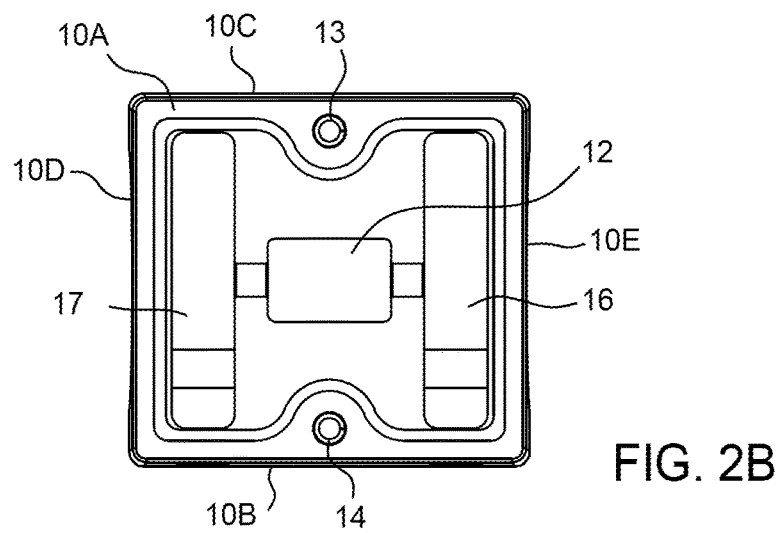
Figure 2C:
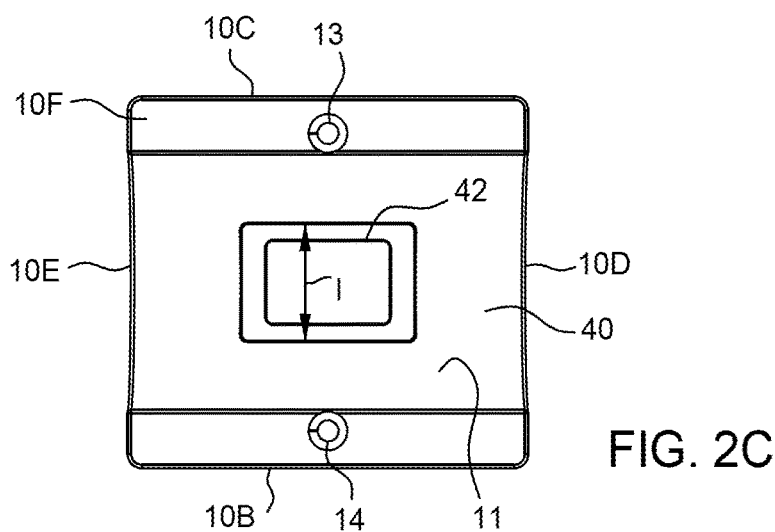
Figure 2D:
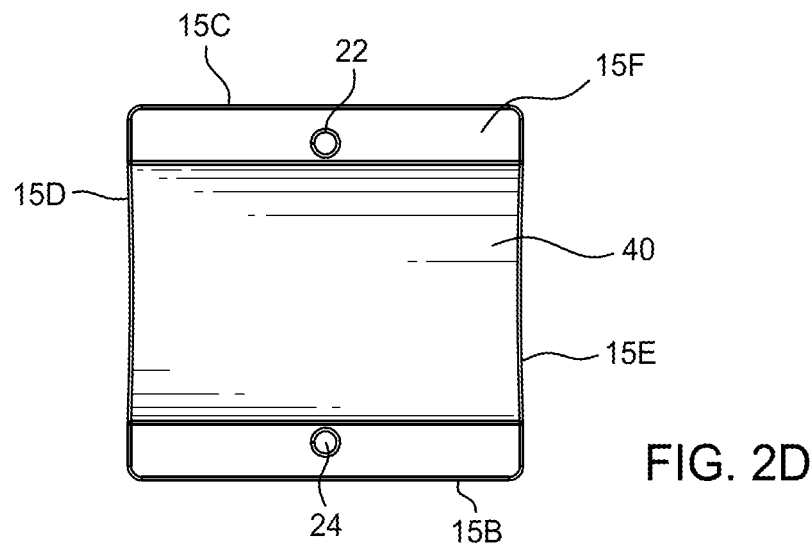
Figure 2E:
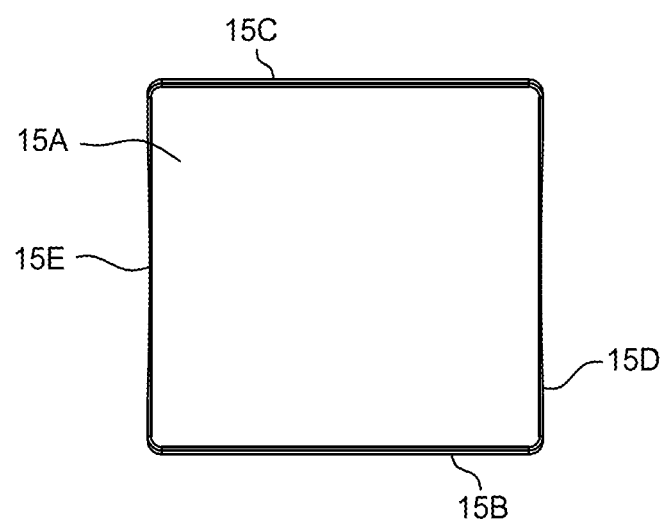
Figure 2F:
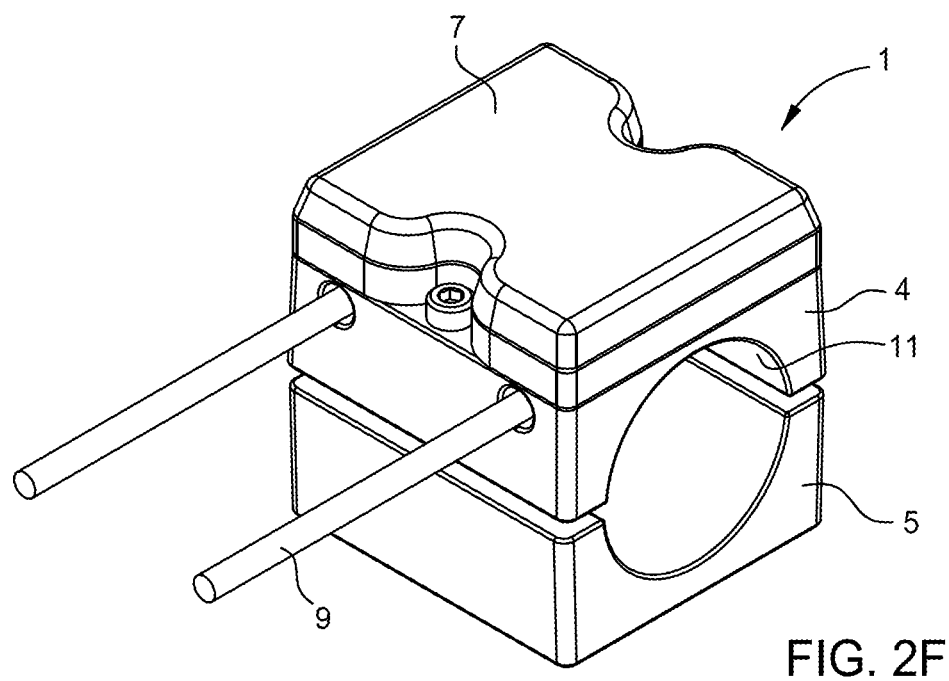

FIG. 2A is an isometric view of a first or second body 4, 5 of the clamping assembly 1. FIGS. 2B and 2C are plan views of the opposed outwardly and inwardly facing faces 10A, 10F of the first body 4 of the clamping assembly 1. FIGS. 2D and 2E are plan views of the opposed outwardly and inwardly facing faces 10A, 10F of the second body 5 of the clamping assembly 1. FIG. 2F is an isometric view of the clamp assembly 1, including the lid 7 thereon. In this embodiment, each of the first and second clamp bodies 4, 5 are generally configured as a rectangular prism with curved outer edges and flat outer surfaces, but on the inwardly or tube facing side thereof, the semi-cylindrical surface 40 extends arcuately inwardly of the first and second bodies 4, 5 from the inwardly facing surface thereof. In one embodiment, the clamp body 4 has six, distinct from one another, outer surfaces, generally, generally flat or planar faces 10A-F, and semi-cylindrical surface 40 extending inwardly of face 10F. The top or outwardly facing face 10A is a square or rectangle in plan view and may have rounded corners, and in use of the clamp assembly 1 the outer face 10A of body 4 is covered by lid 7. The lid 7 fastens over the assembly to provide a moisture seal and electrical isolation.

Referring again to FIGS. 1 to 6, on the opposite side of the body 4 from the outwardly facing face 10A is the inwardly facing face 10F, again a generally planar surface, which is bisected by the recess formed of the inwardly thereof extending semi-cylindrical surface 40. The first pair of fastener cavities 13, 14 extend through the body 4, and the second pair of fastener cavities 22, 24 extend inwardly of the inwardly facing face 10F of the second body 5, and each opens through the outwardly facing face 10A and the inwardly facing face 10F of first and second bodies 4, 5, respectively, to either side of the semi-cylindrical surface 40. Alternatively, the second pair of fastener cavities 22, 24 may extend inwardly of the inwardly facing face 10F of the second clamp body 5, and terminate within the volume of the second clamp body 5. In this case, if the material of the second clamp body 5 has limited yield strength, a threaded insert (not shown) is located within each of the cavities of the second pair of fastener cavities 22, 24. The outer perimeter of each of the first and second bodies 4, 5 includes opposed side faces 10b, 10C, extending generally parallel to one another and terminating their opposed ends at opposed end faces 10D, 10E. Semi-cylindrical surface 40, at its opposed ends in the non-circumferential direction thereof, terminates at end faces 10D, 10E, and outwardly facing face 10A and inwardly facing face 10F likewise terminate, at opposed ends thereof in a first direction, at end faces 10D, 10E, and at opposed sides thereof in a second direction to the first direction, at end faces 10B, 10C.

First body 4 is here configured to receive the thermal pad 3 and the bus bars 6a, 6b thereon or therein, to enable heat transfer between a thermal device 2 to be contacted with the thermal pad 3 and the outer surface and thus the wall of a pipe or tube 8 clamped or otherwise secured between the opposed semi-cylindrical surfaces 40 of the first and second clamp bodies 4, 5. The thermal device 2 is connected to a device located exteriorly of the clamp assembly 1 through the electrically conductive bus bars 6a, b to allow electrical signals to be transmitted to a device such as a thermal monitoring device or to allow an electrical source to input power to the thermal device 2 to cause heating or cooling thereof (not shown).

Here, first body 4 includes three cavities extending inwardly of outwardly facing face 10A, a middle cavity 12 flanked by two rectangular recess cavities 16, 17, one of each disposed to either side of middle cavity 12. The rectangular recess cavities 16, 17 each extend inwardly of the outwardly facing face 10A and generally parallel to the surface direction of end faces 10D and 10E, i.e., in the direction extending between end faces 10D, 10E. The middle cavity 12 is generally centered on the outwardly facing face 10A with respect to the edges of outwardly facing face 10A, and is an opening here having a square or rectangular perimeter wall extending through the body 4 from the outwardly facing face 10A thereof to, and opening through, the semi-cylindrical surface 40 thereof. Middle cavity 12 is configured to allow a thermal transfer element, here a portion of the thermal pad 3, to extend therethrough and also extend beyond the semi-cylindrical surface 40 and the outwardly facing face 10A of the body 4. Thus, when the two bodies 4, 5 of the clamp assembly 1 are secured together, the portion of the thermal pad 3 extending beyond the semi-cylindrical surface 40 contacts the outer surface of a pipe or tube 8 extending within a circumferential boundary defined by the facing semi-cylindrical surfaces 40 of both of the first and second bodies 4, 5, and a different portion thereof extends outwardly of the outwardly facing face 10A. To either side of the middle cavity 12, between the middle cavity 12 and end faces 10D and 10E of body 4, lie the two rectangular recess cavities 16, 17. Each rectangular recess cavity 16, 17 extends inwardly of the outwardly facing face 10A, but not through the body 4, and thus provides a recessed or inset region within which components useful for obtaining, and transmitting, for example, an electrical signal representative of the temperature of a pipe or tube 8 clamped between the first and second bodies 4,5, or useful to provide electrical power to cause the thermal device 2 to increase or decrease in temperature, and thereby transfer heat into, or remove heat from, the pipe or tube 8 through the thermal pad 3.

Each side face, 10B and 10C is a rectangular face with curved edges and rounded corners. The opposed end faces, 10D and 10E respectively, are rectangular faces with curved edges and rounded corners and an arched recess forming the edge thereof where semi-cylindrical surface 40 meets the end face 10D, 10E. Here, the first clamp body 4 is configured of a low thermal conductivity plastic material such as polyethylene, polyacrylate, polyvinylchloride, polycarbonate, ABS, or other relatively low thermal conductivity materials that can be easily machined, molded, or molded to near net shape and then machined, to yield the above-described structural elements. Alternatively, in other applications, the clamp bodies 4, 5 may be configured of high thermal conductivity materials for example, aluminum, or various steels. Additionally, where the clamp bodies are configured of a high thermal conductivity material such as aluminum, or various steels, the thermal pad 3 can be configured as an integral extension of one of the bodies.

The second clamp body 5 is likewise generally a rectangular prism with curved outer edges. The second clamp body 5 also has the six, distinct from one another, outer surfaces, generally faces 10A-F and semi-cylindrical surface 40. The outwardly facing face 15A is a square or rectangular surface with rounded corners. Each side face, 15B and 15C is a rectangular surface with curved edges and rounded corners. The opposed end faces, 15D and 15E respectively, are rectangular surfaces with curved edges and rounded corners and an arched recess edge where the semi-cylindrical surface 40 meets the end faces 15d, 15E. The inwardly facing face 15F is a square or rectangular face with rounded corners and curved edges, and the semi-cylindrical surface 40 extends thereinto to bisect the inwardly facing face 15F. The second pair of fastener cavities 22, 24 extend at least inwardly of the inwardly facing face 15F. The cavities of the second pair of cavities 22, 24 may be threaded, such as with a threaded insert, be blind holes of a diameter whereby the fasteners will self-thread into the walls thereof, or extend through the second body 5 and open at the outwardly facing face 15A thereof, such that a threaded fastener can be secured in the cavities 22, 24 or threaded into a fastener bearing against the outwardly facing face 15a. Thus, fasteners having a head bearing against the outwardly facing face 10A of body 4, one of each extending through one of the first pair of cavities 13, 14 and one of the second pair of cavities 22, 24, to be threaded thereinto or into a female threaded fastener to bear against the outwardly facing face 15A of the second body 5, allow the bodies 4, 5 to be brought together to clamp a pipe or tube 8 therebetween. Alternatively, the first and second bodies 4, 5 may be held together by an exterior clamp, or be hinged together on one sidewall thereof and held together by an integral clasp member on a different sidewall thereof as show in FIGS. 10A and 10B. Like the first body 4, the second clamp body 5 is configured of a low thermal conductivity plastic material such as polyethylene, polyacrylate, polyvinylchloride, ceramic or other relatively low thermal conductivity materials that can be easily machined, molded, or molded to near net shape and then machined, to yield the above-described structural elements. In another embodiment, the second clamp body 5 may be made of a non-electrically insulating material such as a metal if the design warrants the clamp bodies having high thermal conductivity.

Figure 5B:
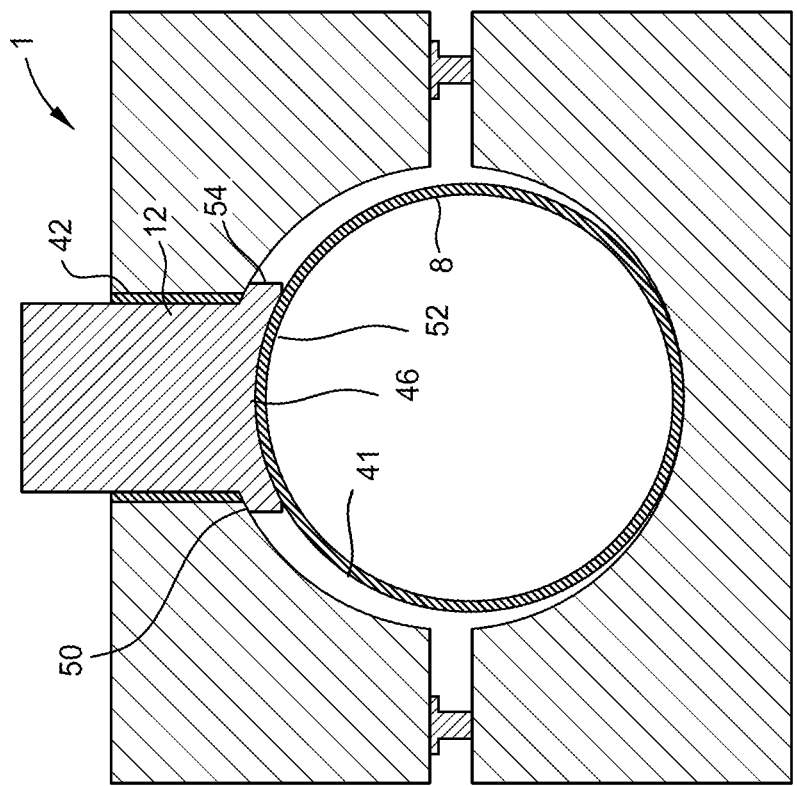
FIGS. 5A and 5B are sectional view of the clamping assembly with and without a tubing fastened inside.
Figure 5A:
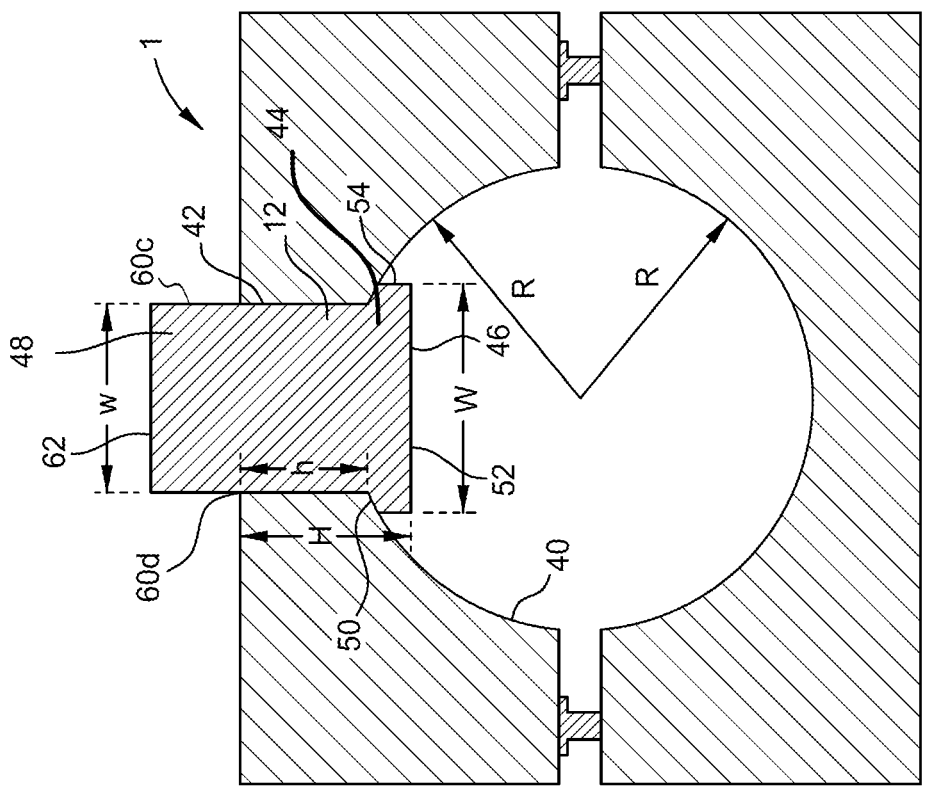

As shown in FIGS. 5A and 5B, the middle cavity 12 in the first clamp body 4 extends from an opening 42 in the outwardly facing face 10A and through the first body 4 to open through the semi-cylindrical surface 40 at opening 44. In one aspect, the cavity 12 is square or rectangular in cross-section, and the portion of the thermal pad 3 extending therethrough has the same cross section as the perimeter of the opening. Other opening or cavity 12 shapes, and corresponding thermal pad cross sections, such as circular, ovoid, multi-sided or other are also contemplated herein. The thermal pad 3 may be free to cove within the opening, may be larger in cross section than that of the cavity 12, or may be adhered to the inner wall(s) of the cavity 12 such as with epoxy or another adhesive. Here, thermal pad 3 includes an enlarged tail portion 46 having a width W greater than the width w of the cavity 12, and optionally a depth, extending in the directional orthogonal to the page of FIG. 5, greater than the corresponding depth of the opening 44 extending in the directional orthogonal to the page of FIG. 5. A projecting portion 48 of the thermal pad 3 extends from the tail portion 46 inwardly of the cavity 12, such that a perimeter ledge 50 extends circumferentially about the location thereof where the projecting portion 48 and tail 46 meet. The perimeter ledge 50 supports the semi-cylindrical surface 40 facing side of the tail 46 against the inwardly facing surface of the semi cylindrical surface 40 of the first body 4 about the perimeter of the opening 42, and thus limits the position of the projecting portion 48 within the cavity 12 and prevents the tail portion 46 from being pushed through the cavity 12. Here, the outer surface 54 of the projecting tail 46 portion has the same cross sectional shape as that of the a generally rectangular perimeter of the cavity 12, here four generally flat walls sized slightly larger than the flat side walls of the cavity 12, such that the projecting tail portion 46 may be easily placed into the opening, and if desired adhered to the sidewalls of the cavity 12, such as with epoxy or another adhesive. In another embodiment, the projecting portion 48 may be easily placed into, and removed from, the cavity 12, i.e., not adhered to the first body 4 or the sidewalls of the cavity 12.

A engagement face 52 of the extending portion forms the terminus of the projecting portion distal to the perimeter ledge 50. In its free state, i.e., where it is not compressed or biased in the direction of the semi-cylindrical surface 40 or the cavity 12, the engagement face 52 of the extending tail portion 46 extends as a flat planar surface outwardly of and across opposed sides of the adjacent semi-cylindrical surface 40 to either side of the cavity 12. As a result, when a tube 8 is received within the perimeter of the semi-cylindrical surfaces 40 of, and clamped between, the first and second bodies 4, 5, the outer surface 41 of the tube 8 will contact the engagement face 52. As the first and second bodies 4, 5 are pulled together such as by the fasteners, clamps, or other mechanisms, the outer surface 41 of the tube 8 will bias the engagement face 52 surface inwardly toward the extending tail portion 46 to conform to the outer surface 41 of the pipe or tube 8, as shown by compressed profile 56 of the engagement face 52 as shown in FIG. 5B. As a result, contact pressure between the surface of the compressed profile 56 of the engagement face 52 and the contacting portion of the outer surface 41 of the pipe or tube 8 is ensured, which ensures high thermal conductivity between the engagement 52 of the projecting portion 48 and the outer surface of the pipe or tube 8. Additionally, the tail portion 46, in the compressed condition thereof of FIG. 5B, where the first and second bodies 4, 5 are clamping the pipe or tube 8 therebetween, causes the outer surface 41 of the pipe or tube 8 to be spaced from the entire semi-cylindrical surface 40 of the first body 4, and spaced from substantially all of the semi-cylindrical surface 40 of the second body 5. It is contemplated herein that the contact between the second body 5, and the outer wall of the pipe or tube, can be as small as line contact therebetween, extending inwardly of the page of FIG. 5B. As a result, changes in the temperature of the outer surface 41 of the pipe or tube 8 caused by heat transfer thereinto or therefrom through the first and second bodies, as well as thermal hysteresis effects, which would occur where the second body forms a heat sink for the second body 5, are minimized.

Tail 46 of thermal pad 3, where here the opening 12 has a generally square or rectangular perimeter, has a generally cuboid shape, having four head perimeter walls 60*a-d* extending generally perpendicularly away from the perimeter ledge 50 and projecting portion 48 and terminating at an upper mounting face 62 as shown in FIGS. 1C and 5A. Tail perimeter walls 60*b, d* are parallel to one another, have the same length in the direction parallel to the outwardly facing face 10A of the first body 4, and terminate at their opposed ends in longer perimeter walls 60*a, c* likewise of equal length to one another in the direction parallel to the outwardly facing face 10A. An element recess 58 extends inwardly of the upper mounting face 62 of the tail 46 of the thermal pad 3, generally parallel to the running direction of head perimeter walls 60*a, c* and it also terminates and opens into, at its opposed ends, head perimeter walls 60*b, d*.

Figure 3:
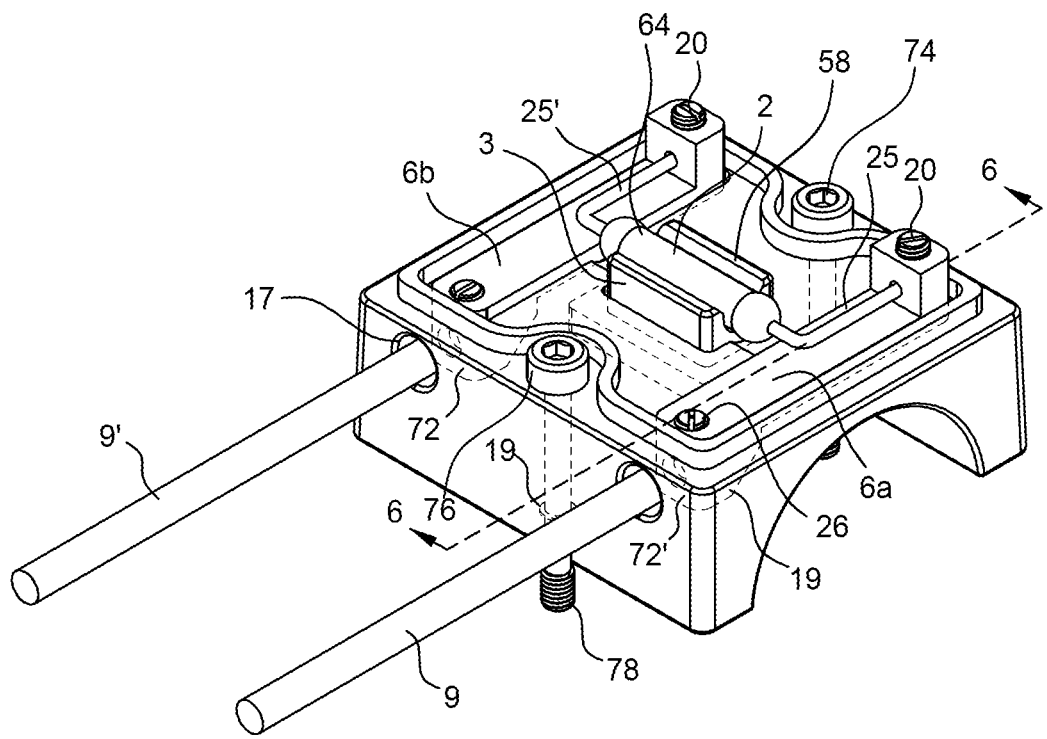
FIG. 3 is an isometric view, partially in phantom, showing the connection of the temperature sensitive element to one of the bodies of the clamping assembly and to the internal components thereof.
Figure 4:
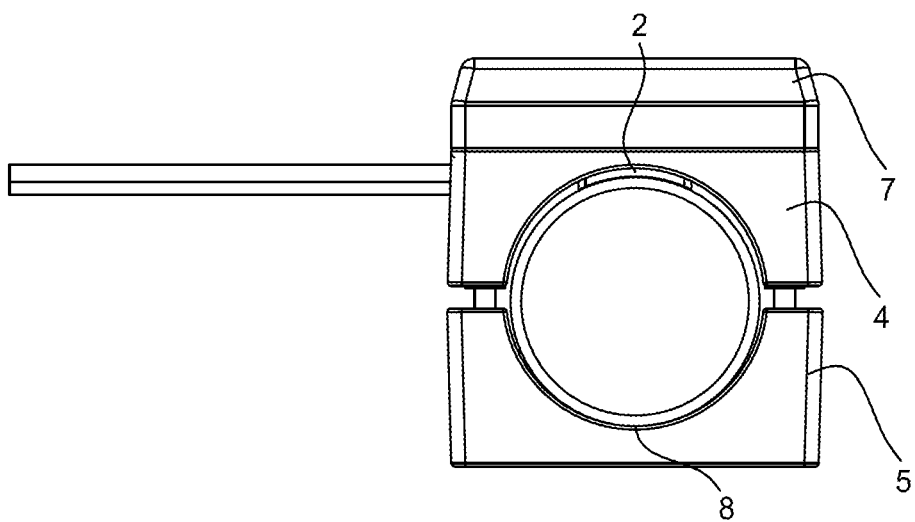
FIG. 4 is a side view of a clamping assembly with a tubing secured therein.

Referring to FIGS. 1C, and 3, element recess 58 is configured to have the same general profile as the outer surface of a thermal device 2, which will extend partially thereinto. For example, here, where the temperature sensing element has a right cylindrical outer surface 64 (FIG. 6), the recess 58 likewise has a generally semi-cylindrical profile, i.e., the ends thereof opening into head perimeter walls 60*b, d* are semicircles or within a few degrees of being semi- circles. Here, the thermal device 2 can include one or more of a temperature-measuring device, thermal fuse, thermal switch, temperature sensor, solid-state temperature sensor, thermocouple, thermostat, heating element or cooling element. In one aspect, the spanning wall 66 of the lid 7 here contacts the outer surface of the thermal device 2 to press the surface thereof opposed to the lid 7 inwardly of the element recess 58, to ensure good thermal contact therebetween. In another aspect, at least a portion of the cylindrical outer surface 64 of the thermal device 2 facing the recess 58 is adhered thereto using a thermally conductive adhesive.

Figure 6:
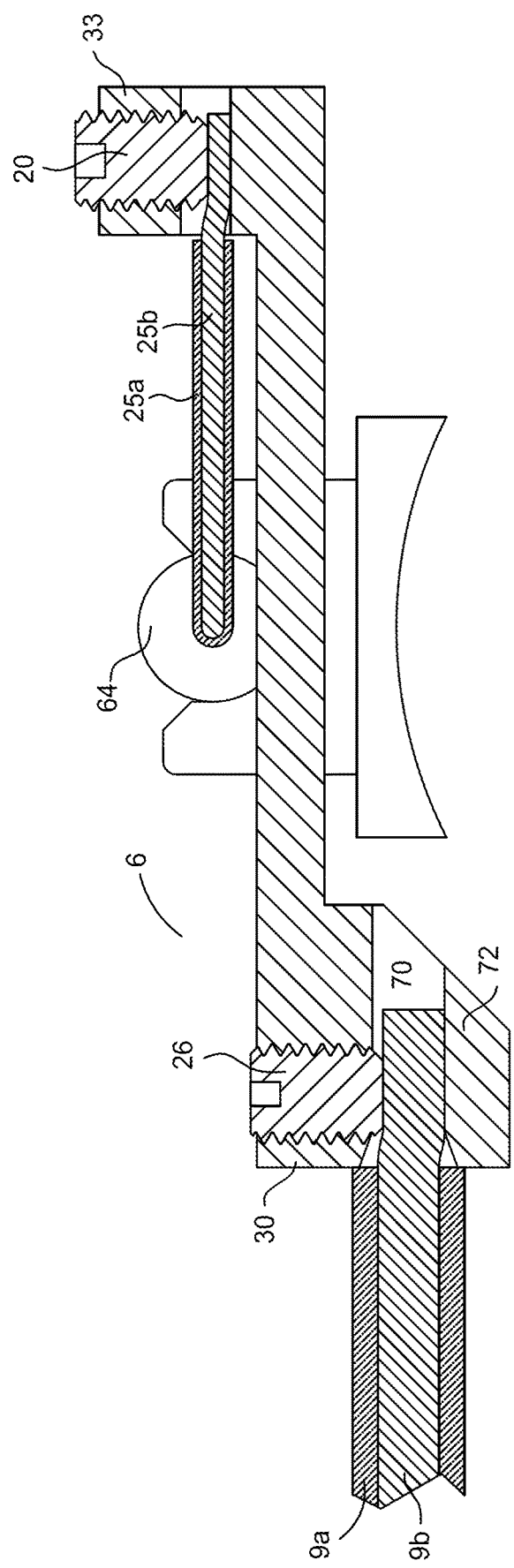
FIG. 6 is a sectional view of an insulator bar shown in FIG. 3, showing the internal electrical routings thereof.

As previously described and as shown in FIGS. 2B and 3, two oblong, here rectangular, recess cavities 16 and 17 extend inwardly of the outwardly facing face 10A of first body 4, one to each side of the middle cavity 12 on the opposed sides thereof not containing fastener cavities 13 and 14, i.e., recess cavity 16 is located between middle cavity 12 and side face 10E, and recess cavity 17 is located between middle cavity 12 and side face 10D. The rectangular recess cavities 16 and 17 extend into the body of the first clamp body 4 from the outwardly facing face 10A thereof but not through to the semi-circumferential surface 40 thereof. Here, the thermal device 2 includes a pair of conductive wires 25, 25' extending therefrom. The rectangular recess cavities 16 and 17 are shaped to hold a first and a second bus bar 6*a*, 6*b* respectively, each of the same construction. Each bus bar 6*a*, *b* is conductive and is configured to electrically interconnect the conductive wires 25, 25' with corresponding conducting lines 9, 9' associated therewith As shown in FIG. 6, each bus bar 6*a*, *b* here has the same construction and are interchangeable, and each receives therein one of the conductive wires 25, 25', which is crimped or clamped therein to electrically connect the conductive wire 25 or 25' thereto using a first conductive fastener 20 in physical and electrical contact with a bus bar 6*a*, *b*, and a conductive line 9, 9' which is crimped or clamped therein using a second conductive fastener 26 physically and electrically connected to a bus bar 6*a*, *b*, to electrically connect the thermal device 2 to the exterior of the clamp assembly 1 through the conductive lines 9, 9'. The conductive lines 9 may lead to a temperature threshold alarm, a temperature readout monitor, a controller controlling the fluid properties such as flow rate, temperature, viscosity, and heater or cooler controller or power supply where the thermal device is a heating or a cooling device, etc., or another monitoring or control element.

The conductive lines 9, 9' each extend into corresponding openings 72, 72' extending inwardly of one of the end faces 10B and 10C of the first clamp body 4, here face 10B, and into a corresponding one of the recess cavities 16, 17. As shown in FIG. 6, which is a sectional view of the bus bars 6*a*, *b*, each of the conductive lines 9 includes an outer insulative jacket 9*a*, and a central conductive core 9*b*. Jacket 9*a* is stripped away from the core near the terminal end of each conductive line, such that the conductive core 9*b* extends inwardly of a connection opening 70 in the sidewall of each of the bus bars 6*a*, 6*b*. The second conductive fastener 26, for example a machine screw also in contact with conductive bus bar 6*a*, 6*b*, is tightened to pinch the conductive core 9*b* of each conductive line between the surface of the second conductive fastener 26 and the inner surface of the connection opening 70. Each bus bar 6*a*, 6*b* is thus electrically connected to the conductive core 9*b* of the conductive lines 9, 9'. The bus bars 6*a* and 6*b* extend longitudinally from the first end 30 of the bus bar 6 to a location inwardly of the second end 32 thereof, wherein the bus bar 6 contacts the first conductive fastener 20, for example a machine screw, comprising a conductive material.

The second end 32 of the bus bar 6 has an upper protrusion or lip 33 into which a wire receiving opening 31 extends, and a threaded opening into which the first conductive fastener 20 is threaded. The base of the shaft of the first conductive fastener 20 face the lower portion of the wire-receiving opening. The end of the conductive wires 25, 25', first conductive wire 25 shown, extends inwardly of the wire receiving opening 31. By threading the first conductive fastener 20 inwardly of the upper lip, the base of the shaft thereof biases a portion of the first conductive wire 25 against the wall of the wire receiving opening 31, thus electrically connecting the conductive wire 25 to the exterior of the clamp assembly 1 through the bus bars 6a, b and the exteriorly extending conductive line 9. Similarly, the second conductive wire 25' is electrically connected through the second bus bar 6b to an exterior conductive line 9', to connect the first and second conductive wires 25, 25' to a component external to the clamp assembly.

As discussed previously herein, the thermal device 2 can include one or more of a temperature-measuring device, thermal fuse, thermal switch, temperature sensor, solid-state temperature sensor, thermocouple, thermostat or other thermally sensitive element or a heat generating, or a heat sinking (cooling) element. The clamp assembly 1 can thus be configured, along with an external monitoring circuit, to act as a high- or low-temperature alarm, cutoff, or real-time measuring or monitoring device for an outer wall of a pipe or tube 8, and the monitored or measured value of the wall temperature used to control or shut off an equipment (not shown) to which, from which, or within which fluid in the pipe or tube 8 monitored by the clamping assembly is flowing or present. For example, where the outer surface 41 temperature of the pipe or tube 8 desirably operates in a specific temperature range, the measured or monitored temperature can be used to interrupt the power supplied to the equipment for safety or performance reasons, or to control a thermal fluid circuit associated with the equipment to maintain the wall temperature within a range indicative of a desired temperature of the fluid in the pipe or tube 8. Additionally, the thermal device 2 may be configured to transmit data received or generated therein indicative of the temperature of the wall of the tubing 8 wirelessly. In which case the bus bars 6a, b are unnecessary. Additionally, the conductive lines 9, 9' can be connected to a wireless transmitter to transmit data regarding the wall temperature of the pipe or tube 8 to a control device for an equipment. Likewise, the data output from the thermal device may be recorded or logged to monitor the thermal conditions of the outer wall of the pipe or tube 8, the electrical conditions of the thermal device, or both. Here, the conductive wires 25, 25' extend from the thermal device on opposed ends or sides thereof. However, other configurations, for example where the conductors in the form of conductive wires 25, 25' extend from the same side or end of the thermal device 2, are also contemplated. Additionally, the thermal device 2 can be configured as a heating or cooling device, whereby heat transfer occurs through the thermal pad 3 to transfer heat from the pipe or tube 8 to the thermal device 2, or to transfer heat from the thermal device 2 to the pipe or tube 8. The thermal device 2 can be grounded to, or ungrounded from, the clamping assembly 1, depending on the use or requirements of the thermal device 2. If the thermal device 2 is to be grounded to the clamping assembly, at least one of the first and second bodies 4, 5 need be conductive and connected through a ground strap to ground, where the thermal device is electrically connected to the grounded body, or be conductive where the pipe or tube 8 is grounded and contact between at least the second clamp body 5 on the wall of the pipe or tube 8 be of sufficient quality to provide an electrically conductive path therebetween, or be insulative and a ground strap provided to ground to which the thermal device 2 can be electrically connected.

As shown in FIGS. 2D and 3, to fasten together the first body 4 and second body 5, fasteners, herein bolts 74 having a machine screw thread, extend through first body 4 and are received within threaded cavities 22, 24 in the second body 5, or extend through unthreaded versions of the cavities 22, 24 extending fully through the second body 5. Additionally, the bolts 74 can be configured with self-tapping threads, wherein they will form threads in the cavities 22, 24 when turned thereinto to secure the first and second bodies 4, 5 together. Each bolt 74 has an enlarged bolt head 76 and long, thinner threaded shaft 78. The bottom or underside of the bolt head 76 rests or bears on a recess surface on the outwardly facing face 10A of the first body. The bolt shafts 78 extend through the cavities 13 or 14 extending from the face 10A, through the first clamp body 4, and outwardly of the inwardly facing face 10F of first body 4. Threaded washers 19 are connected to the bolt shafts 78 adjacent the inwardly facing face 10F of the first body 4 to retain the bolts 74 thereon. A bolt 74 extends through each cavity 13, 14 extending through the first clamp body 4. Here, the end of the shaft 78 of the bolt 74 extends into the cavities 22, 24 extending into the second clamp body 5 and opening into inwardly facing face 15F of the second clamp body 5. The cavities 22, 24 may include a threaded insert therein, into which the shafts 78 of the bolts 74 are threaded to pull and secure the first and second bodies 4, 5 together, or the cavities 22, 24 may extend through the second body, and open into the outwardly facing face 15A thereof, wherein a threaded fastener such as a nut located over a lock washer is threaded over the end of the shaft 78 and tightened to pull the first and second bodies 4, 5 together.

In FIGS. 5A and 5B the first and second clamp bodies 4, 5 are shown disposed over and around a tubing 8 and interconnected by fasteners such as the bolt 74 threaded into a threaded insert (not shown) in the cavities 22, 24 of the second clamp body 5. Other connecting paradigms, for example clamps, may be employed to hold the first and second clamp bodies together over tube 8. Engagement face 52 of projecting portion 48 of the thermal pad 3 is deformed to follow the outer circumference or contour of the tube 8 against which it is biased. Here, at least the portion of the thermal pad 3 adjacent to the engagement face 52 is conformable or deformable to match the contour of the wall of the element clamped between first and second clamp bodies 4, 5, and when the thermal pad 3 is no longer contacting the wall of an element clamped between first and second clamp bodies 4, 5, is self-restoring to its non-deformed or non-conformed contour. Alternatively, the engagement face 52 and outer surface 41 of the pipe or tube 8 can be adhered to one another using a conductive adhesive.

Referring to FIG. 5, the clamping assembly 1 is here configured to enable physical, by contact, connection of the engagement face 52 of the heat transfer thermal pad 3 to the outer surface 41 of a piping or tubing 8. For example, the clamping assembly 1 can be used to perform automated temperature testing of a piping or tubing 8, and therein be configured to be connected to a temperature read out monitor or a temperature threshold alarm. Additionally, temperature testing of the different areas of a piping/tubing 8 or different pipes or tubes 8 may be performed by detachment and reattachment of the clamp assembly 1 on different segments of pipes or tubes 8 for which the temperature is of interest, such as an area of a tube 8 known to flow extremely hot or cold fluids. When in use, the clamp assembly 1 is comprised of the first clamp body 4, the second clamp body 5, the heat transfer thermal pad 3, and the bus bar 6, and optionally the lid 7. The thermal device 2 is received therein, in contact with the thermal pad 3. One function of the clamping assembly 1 is to transfer heat between a measured surface such as a wall of a pipe or tube 8 and the thermal device 2 and thus correlate or measure the temperature (hot or cold) of the outer surface 41 for analytic or safety purposes. Thus, where the thermal device 2 is one of a heater or a cooling device, the thermal device 2 can be used to raise or lower the temperatures of the wall of the pipe or tube 8, and thus at least locally change the temperature of a fluid therein. When the thermal device 2 is configured as a heater or a cooling device, the thermal device 2 may also incorporate a temperature sensing function therein to allow a user of the clamp assembly 1 to correlate the heat transferred into or out of the wall of the pipe or tube 8 to the temperature, and temperature change of the wall of the pipe or tube 8, and thus infer a change in the fluid immediately adjacent thereto.

During temperature measurement or monitoring, the first clamp body 4 of the clamping assembly 1 serves two purposes. The first clamp body 4 acts a portion of the clamping mechanism extending around the measured tubing/piping 8 and in one aspect, via the thermal pad 3, thermally connects the thermal device 2 with the clamped member wall and also provides the electrical connections between the thermal device 2 to the conductive lines 9. In this embodiment, the first clamp body 4 is made of an electrically non-conductive material and thermally low-conductivity material. The first clamp body 4 can either conform to the measured tubing/piping 8 for more surface area clamping or include a portion offset from the semi-cylindrical surface 40 to reduce heat transfer away from the thermal device 2 and into the clamp (called thermal shunting) with as little contact as line contact between the clamped member and the second clamp body 5, and only contact with the thermal pad 3 and not the remainder of the first clamp body 4. Alternatively, the first body 4 and the thermal pad 3 may be configured as a single integral member, having sufficient conformability to conform to the outer surface of an element clamped therein.

Multiple methods to physically conform to the tubing/piping 8 can be used. The second clamp body 5, can be optimized for strength, cost, thermal performance, or to prevent physical interference from external components. This can be accomplished via design and/or material selection. The second clamp body 5 has minimal contact points and/or low heat transfer or thermal conductivity properties through selection of low heat transfer or thermal conductivity materials such as ceramics or plastics. If strength is a priority, selection of low thermally conductivity materials such as filled plastic is contemplated. In one aspect, the semi-cylindrical surface 40 of the second clamp body 5 is sized, with respect to the pipe or tube 8 outer circumference, to minimize the contact area therebetween and thus minimize the thermal coupling between the second clamp body 5 and the semi-cylindrical surface 40 of the pipe or tube. This will reduce uncontrolled heat transfer between the pipe or tube 8 and the second clamp body. Preferably, line or even point contact in the non-circumferential direction of the semi-cylindrical surface 40 can be achieved between the semi-cylindrical surface 40 and the outer surface of the pipe or tube 8, to limit heat transfer therebetween. Line contact can be achieved by configuring the radius of the semi cylindrical surface 40 to be larger than that of the pipe or tube 8 outer surface, but not so much greater that the pipe or tube 8 will not be pinched, and thus clamped, between the engagement face 52 and the line of contact between the pipe or tube and the semi cylindrical surface 40 of the second clamp body 5. Additionally, the arcuate surface can, instead of being a semi cylindrical surface 40, can be a semi-ellipsoid surface, where the depth of the arcuate surface inwardly of the inwardly facing face 10F is, for example, less than ½ the width thereof in the direction between faces 10B and 10C.

Figure 7:
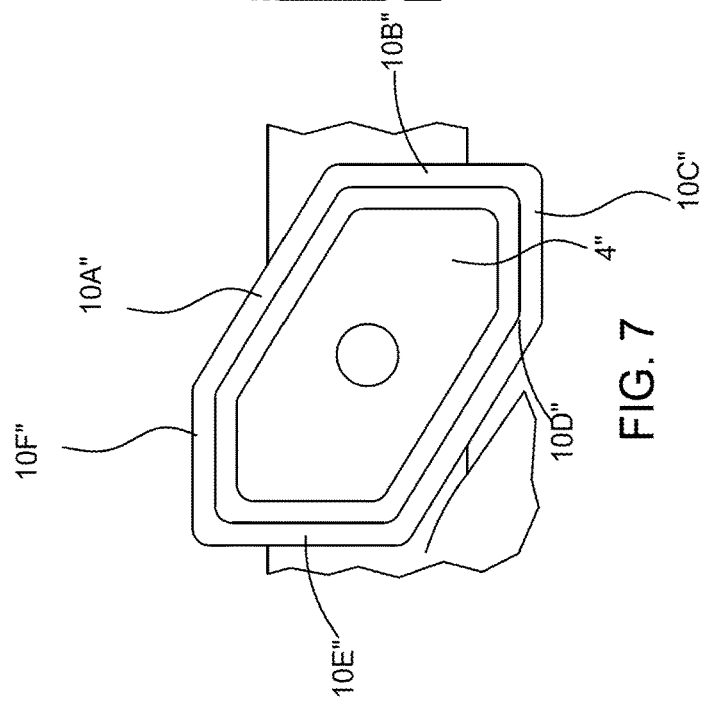
FIG. 7 is a sectional side view of a portion of a clamp body of the clamp assembly thereof, including a thermal pad extending on, and into, the clamp body and a thermal device contacting the thermal pad.

In another embodiment as shown in FIG. 7 alternatively shaped clamp bodies are shown. Here, the first and second alternative clamp bodies 4", 5" (only 4" shown) are generally configured as an oblong or egg shaped prism with curved outer edges and flat outer surfaces, but on the inwardly or tube facing side thereof, the semi-cylindrical surface 40 extends arcuately inwardly of the first and second alternative clamp bodies 4", 5" from the inwardly facing surface thereof, i.e., from the surface of each clamp body 4", 5" facing the other one of the clamp bodies 4", 5". The alternative clamp body 4" has eight, distinct from one another, outer surfaces, generally six flat or planar side faces 10A"-F", an upper surface 10G" and the lower surface (not shown) having the semi-cylindrical surface 40 of FIG. 2A extending thereinto. The top or outwardly facing upper surface 10G" is an oblong polygon in plan view and may have rounded corners, and in use of the clamp assembly 1 the outer face 10A of body 4 is covered by a modified, oblong, lid 7". The oblong lid 7" fastens over the assembly to provide a moisture seal and electrical isolation, and may be adhered thereto with an adhesive.

In another embodiment each of the first and second clamp bodies 4, 5 are generally configured as a n-sided prism with curved outer edges and flat outer surfaces, but on the inwardly or tube facing side thereof, the semi-cylindrical surface 40 extends arcuately inwardly of the first and second bodies 4, 5 from the inwardly facing surface thereof.

Figure 9:
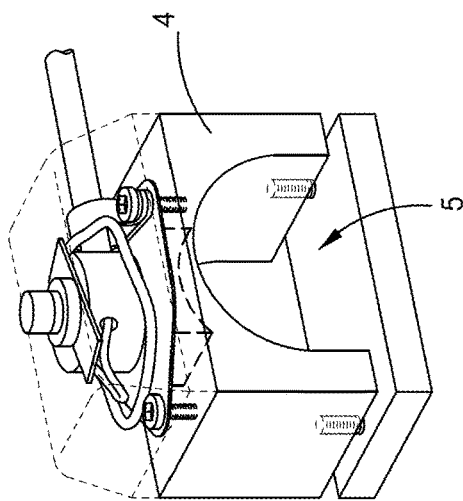
FIG. 9 is an isometric view of a further additional alternative clamp assembly.
Figure 8:
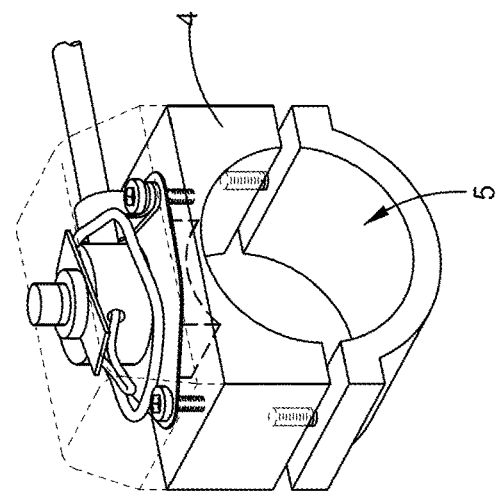
FIG. 8 is an isometric view of a further alternative clamp assembly.

In another embodiment, the second clamp body 5 is generally a 3-dimensional arched prism with curved outer edges as seen in FIG. 8. Here, the outwardly facing face of the second clamp body includes an outwardly extending arched portion, extending from and between the outwardly facing faces thereof. In the aspect shown, the thickness of the second clamp body remains relatively continuous. In another embodiment, the second clamp body 5 is generally a flat rectangular prism or plate, wherein the second clamp body 5 does not contour to a curvature of a pipe, as seen in FIG. 9. Where the face 110 of the plate shaped body of the second clamp body facing the first clamp body 4 is planar, line contact or nearly line contact between the outer surface 41 of a pipe or tube 8 and the lower clamp body 5 can be achieved. Additionally, by chamfering the surface 110 into two planes 110*a*, *b* meeting at a ledge 112, point contact between the outer surface 41 of the pipe or tube 8 and the lower clamp body 5 is achievable.

In another embodiment as depicted in FIG. 10A, a schematic sectional view of a hinged clamping assembly 100 having the first and second bodies 4, 5 as previously described herein hinged together with a pin hinge 200 is shown. In another embodiment as depicted in FIG. 10B a schematic sectional view of a web hinged clamping assembly 200 hinged together with flexible hinge configured as a web 250 made of clamp body material is shown. The hinges 200, 250 allow the first and second clamp bodies 4, 5 to be arcuately opened in the directions of arrows O/C to increase the gap between the adjacent ends of faces 10C and 15C, to receive a pipe or tube 8 therebetween, and then closed over the pipe or tube 8 in the directions of arrows O/C and affixed to one another. In the case of the first and second bodies 4, 5 being attached through a pin hinge, the upper panel 210 of the pin hinge 200 is attached to the end face 10B of the first clamp body 4 through a fastener 201 which passes through the upper panel 210 of the pin hinge 200, through the end face 10B of the first clamp body 4, and is threaded into the first clamp body 4. The lower panel 211 of the pin hinge 200 is attached to the outer wall 15B of the second clamp body 5 through a fastener 202 which passes through the lower panel 211 of the pin hinge 200, through the outer wall 15B of the second clamp body 5, and is threaded into second clamp body 5. In the case of the clamp bodies 4, 5 being attached through a flexible web hinge 250 the flexible web hinge comprised of the clamp body material, but is thin enough to be flexible but study enough to provide clamping force. The flexible web hinge 250 is molded to or epoxied to the inwardly facing face 10F of the first clamp body 4 and is molded to or epoxied to the inwardly facing face 15F of the second clamp body 5. The clamping assemblies 100 are here configured to enable physical contact of the engagement face 52 of the heat transfer thermal pad 3, and a portion of the semi-cylindrical surface 40 of the second body 5 to a piping or tubing 8. In one aspect, a clasp is provided to hold the first and second bodies 4, 5 together along the faces 10C, 15C thereof. Clasp here includes a ledge 112 projecting outwardly of the face 10C and formed contiguously therewith, and a living hinge 114 extends from the outer face 15C of the second body 5 and includes a connecting portion 116 extending from face 15C, an extending flexure 118 extending from the connecting portion 116 in the direction of the first clamp body, and a receiver slot 120 extending inwardly of the flexure 118 and configured to receive the ledge 112 therein. Other clasp configurations, use of fasteners as described with respect to the clamp bodies of FIGS. 1 to 5 herein, clamps, or other interconnection paradigms to hold the first and second bodies 4, 5 to pinch or clamp the pipe or tube 8 therebetween are specifically contemplated herein.

Figure 11:
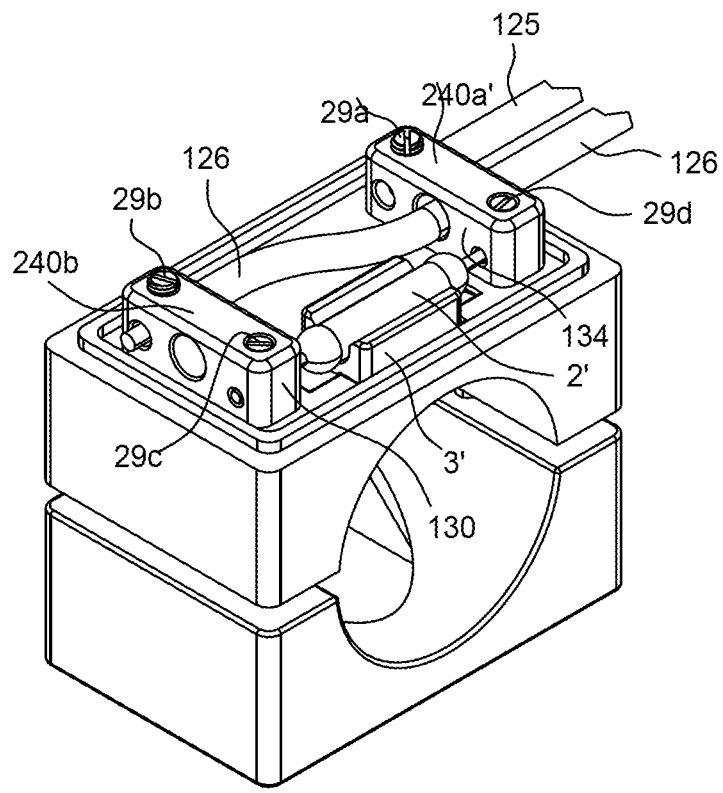
FIG. 11 is an isometric view of a modified clamp assembly with the lid removed, showing details of modifications to the thermal coupling and electrical connections of the first body thereof.
Figure 12A:
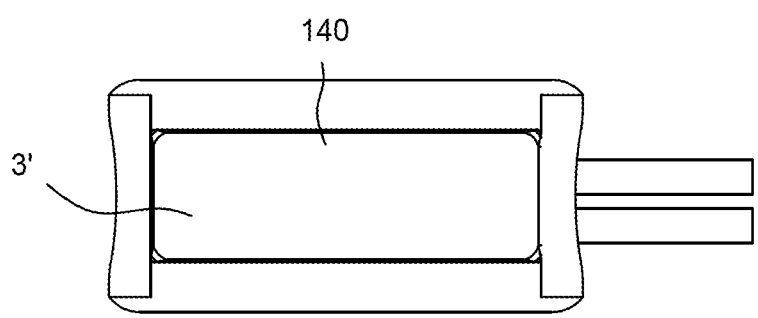
FIG. 12A is a top view of a body lid for a clamp assembly.
Figure 12B:
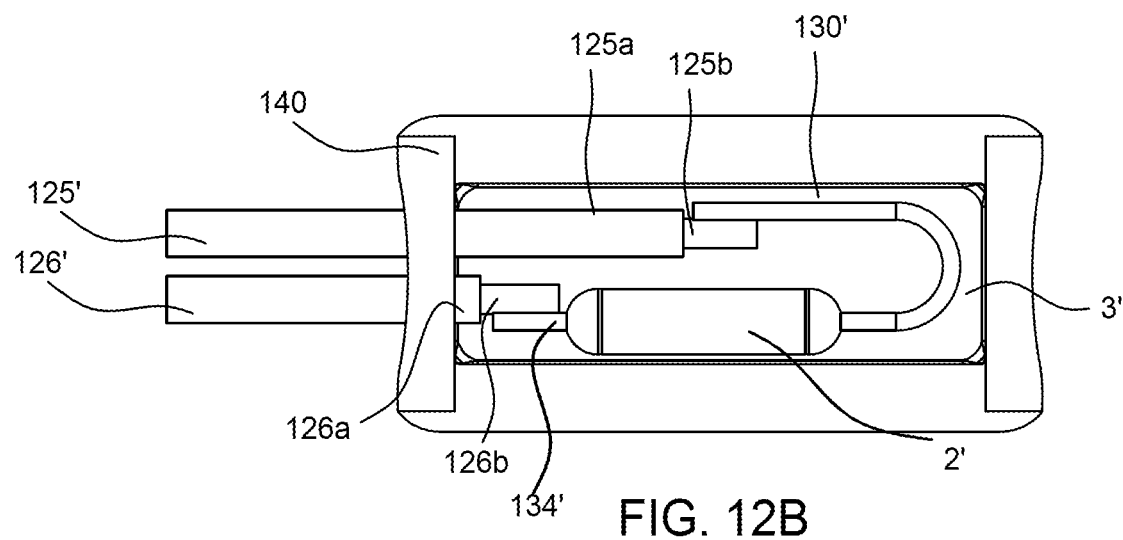
FIG. 12B is a bottom view of the body lid of FIG. 12A.
Figure 12C:
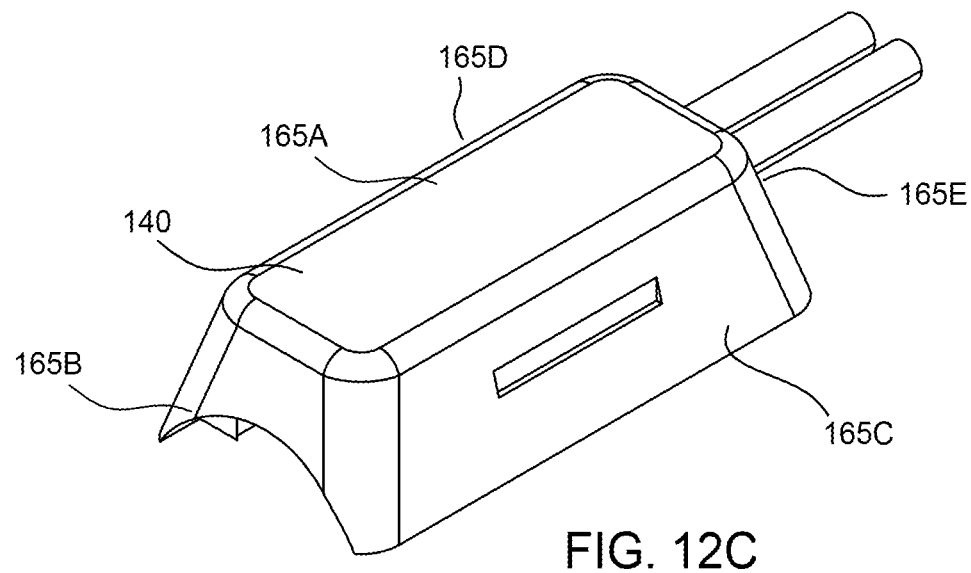
FIG. 12C is an isometric view of the body lid of FIGS. 12A and 12B.
Figure 12D:
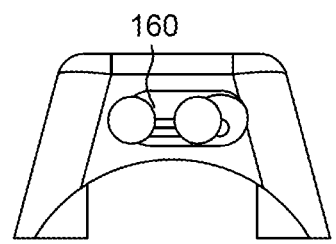
FIG. 12D is a side view of the body lid of FIGS. 12A, 12B and 12C.

In another embodiment as depicted in FIG. 11, a schematic sectional view of the clamping assembly 1 with an alternate wiring connection construct is shown. Here, one middle cavity 12' extends inwardly of the outwardly facing face 10A of the first body 4. Here, cavity 12' is offset to one side of outwardly facing face 10A, here adjacent to face 10E. A first and a second wire guide 240a, 240b, each of identical construct to the other, lie on top of the outwardly facing face 10A of the first body 4, and extend generally parallel to the opposed faces 10B, 10C. The wire guides 240a, 240b are generally each a rectangular prism shape with 6 faces; two square walls 143, 144, an outwardly facing face 145, an inwardly facing face epoxied to the outwardly facing face 10A of the first clamp body 4, and a first and second oblong region 141, 142 with a circular prismatic hole 149 in the center of the first and second oblong regions 141, 142 and extending therethrough. The wire guides 240a, 240b are configured of an electrically conductive material. The first wire guide 240a, is configured to electrically and physically connect to the first conductive wire 125. The first wire guide 250a receives therein the first conductive wire 125 which is crimped therein using a first conductive fastener 29a in electrical contact with the first wire guide 240a, and a first conductive line 134 which is crimped therein using a second conductive fastener 29b electrically connected therein. The first thermal device conductive line 134 extends from the first wire guide 240a to a thermal device 2' resting in the recess of the heat transfer thermal pad 3' as described previously. A second conductive line 130 extends from the opposite end of the thermal device 2' to the second wire guide 240b which is crimped therein using a third conductive fastener 29c. The second wire guide 240b receives therein the second conductive wire 126, which is crimped therein using a fourth conductive fastener 29d in electrical contact with the second wire guide 240b. The second conductive wire 126 extends from the second wire guide 240b, through the hole 149 in the first wire guide 240a and is electrically isolated from the first wire guide 240a by the external insulate jacket on the second conductive wire, whereby both the first and second conductive wires 125, 126 may lead to a temperature threshold alarm, a temperature readout monitor, a controller controlling the fluid properties such as flow rate, temperature, viscosity, and heater or cooler controller where the thermal device is a heating or a cooling device, etc., or another monitoring or control element.

In another embodiment hereof as depicted in FIG. 12, the electrical interconnects may be configured without bus bars. Here, the electrical interconnects are fitted into moldings in a body lid piece 140. The body lid piece combines the first clamp body 4 with the lid 7. It has one outwardly facing 165, a first and second oblong side face 165C, 165D opposite each other, and a first and second smaller face 165B, 165E with an arched recess therein. The second smaller face 165E has two cavities 160, 162 extending therethrough. The first conductive wire 125' enters through a first cavity 162 in the body lid piece 140. Here, each of the conductive wires 125', 126' includes an outer insulative jacket 125a, 126a and a central conductive core 125b, 126b. Jacket 125a is stripped away from the core near the terminal end of each conductive wire such that the conductive core 125b, 126b extends inwardly of a connection point with the first or second conductive line 130',134' of the thermal device 2'. The thermal device resting in the recess of the heat transfer thermal pad 3' as described previously. The thermal pad 3" here extends the entire width and length of the outwardly facing face 165A of the body lid piece 140.

Thermal pad 3" extends into an opening region 142 of the body lid piece 140. Here, body lid piece 140 includes opposed arcuate lower walls 144 and opposed side flanges 146. A pipe or tube 8 is receivable between the opposed side flanges 146, such that the outer surface 41 of the pipe or tube 8 is engageable against the portion of the thermal pad 3' extending outwardly from the body of the body lid piece 140 between the opposed side flanges 146, and the outer surface 41 of the pipe or tube can engage against the arcuate lower walls to limit the compression of the thermal pad 3'. The body lid piece 140 can be connected to a second body 5 as shown in any of FIGS. 1 to 9, or otherwise clamped to a pipe or tube 8.

What is claimed is:

1. An apparatus for receiving a thermal element, comprising;
    a clamp assembly comprising first and second clamp bodies:
    the first clamp body comprising a heat transfer element and a first and a second electrical connection connected thereto, the first clamp body further comprising an inner surface and an outer surface opposed to the inner surface;
    the second clamp body connectable to the first clamp body to form a clamping cavity therebetween within which a clamped element having a wall is securable, the heat transfer element configured to contact an outer surface of the clamped element therebetween; and the heat transfer element is conformable to a contour of a portion of the wall of the clamped element when in contact therewith;

wherein, the heat transfer element further comprises;
a first thermally conductive pad portion and a second thermally conductive pad portion, the first thermally conductive pad portion extending from the inner surface of the first clamp body and inwardly of the clamping cavity and the second thermally conductive pad portion extending from the first thermally conductive pad portion and inwardly of an opening in the first clamp body and extending outwardly of the outer surface of the first clamp body thereof;

the heat transfer element receiving the thermal element thereagainst at a location outwardly of the outer surface of the first clamp body.

2. The apparatus of claim 1, wherein the first and second electrical connections comprise a first bus bar and a second bus bar, each configured to receive and electrically connect to a different conductive wire extending from the thermal element and to a different conductive line extending therefrom, the conductive lines extending outwardly from an electrical interconnection with the conductive wire of the first and second bus bars.

3. The apparatus of claim 2 wherein each of the conductive lines and the conductive wires are connected to the respective bus bars with first and second fasteners.

4. The apparatus of claim 1 wherein the first and second clamp bodies comprise a thermally insulative material.

5. The apparatus of claim 1 wherein the thermally conductive pad portion which includes at least a portion thereof which is restoratively conformable and which extends inwardly of the clamping cavity, such that a portion thereof extending inwardly of the clamping cavity is contactable against a portion of the wall of the clamped element when clamped therein, and the portion thereof extending inwardly of the clamping cavity is conformable to a contour of the portion of the wall of the clamped element in contact therewith.

6. The apparatus of claim 1 wherein, the heat transfer element further comprises at least one of a thermally conductive material, a thermal paste, graphite, or a metal.

7. The apparatus of claim 1, further comprising a thermal paste disposed on a portion of the heat transfer element extending inwardly of the clamping cavity.

8. The apparatus of claim 1, wherein the heat transfer element further comprises
the first thermal pad portion comprising a first width and the second thermal pad portion comprising a second width, the first width greater than the second width, wherein the first thermal pad portion comprising a first width extends outwardly of and across opposed sides of the adjacent inner surface of the first clamp body to either side of the opening in the first clamp body.

9. The apparatus of claim 8, wherein the second thermal pad portion includes a thermal device recess therein configured to receive a thermal device therein.

10. The apparatus of claim 9, further comprising a cover extending over the first clamp body to bias a thermal device inwardly of the thermal device recess.

11. A method for heat transfer between an element and a thermal device, comprising;
providing a clamp assembly comprising first and second clamp bodies:
the first clamp body comprising a heat transfer element extending inwardly of an opening in the first clamp body and a first and a second electrical connection connected thereto, the first clamp body further comprising an inner surface and an outer surface opposed to the inner surface;
the second clamp body connectable to the first clamp body to form a clamping cavity therebetween within which a clamped element is securable, the heat transfer element configured to contact an outer surface of the clamped element therebetween, wherein the heat transfer element is conformable to a contour of a portion of the outer surface of the clamped element when in contact therewith;
the heat transfer element receiving the thermal device thereagainst outwardly of the outer surface of the first clamp body;
wherein the heat transfer element comprises a thermal pad which includes at least a first portion and a second portion, the first portion thereof which extends inwardly of the clamping cavity, such that the first portion thereof extending from the inner surface of the first clamp body and inwardly of the clamping cavity is contactable against a portion of the outer surface of the clamped element when clamped therein, and the first portion thereof extending inwardly of the clamping cavity is conformable to a contour of the portion of the outer surface of the clamped element in contact therewith
wherein the second portion extending from the first portion and inwardly of an opening in the first clamp body and outwardly of the outer surface thereof.

12. The method of claim 11, wherein the first and second electrical connections comprise a first and a second bus bar, each configured to receive and electrically connect to a different conductive wire extending from the thermal device and to a different conductive line extending therefrom, the conductive lines extending outwardly from an electrical interconnection with the conductive wire of the first and second bus bars.

13. The method of claim 12 wherein each of the conductive lines and the conductive wires are connected to the respective bus bars with first and second fasteners.

14. The method of claim 11 wherein the first and second clamp bodies comprise a thermally insulative material.

15. The method of claim 11 wherein the heat transfer element further comprises
the first portion comprising a first width and the second portion comprising a second width, the first width greater than the second width, wherein the first portion comprising a first width extends outwardly of and across opposed sides of the adjacent inner surface of the first clamp body to either side of the opening in the first clamp body.

16. The method of claim 11 wherein, the heat transfer element further comprises at least one of a thermally conductive member, a thermal paste, graphite, or a metal.

17. The method of claim 11, further comprising a thermal paste disposed on a portion of the heat transfer element extending inwardly of clamped cavity.

* * * * *